United States Patent [19]

Morgin et al.

[11] Patent Number: 5,170,582
[45] Date of Patent: Dec. 15, 1992

[54] FISH BAIT SCENTING ARRANGEMENT

[76] Inventors: Christopher E. Morgin, P.O. Box 1561; Wanda R. Morgin, P.O. Box 1323, 6743 California St., both of Winton, Calif. 95388

[21] Appl. No.: 874,439

[22] Filed: Apr. 27, 1992

[51] Int. Cl.⁵ .................................................. A01K 97/00
[52] U.S. Cl. .................................................. 43/54.1
[58] Field of Search ............... 43/54.1, 55, 56, 4; 206/315.11, 205, 579; 114/110, 111, 112, 113

[56] References Cited

U.S. PATENT DOCUMENTS

| | | | |
|---|---|---|---|
| 2,849,828 | 9/1958 | Johnson | 43/55 |
| 3,835,575 | 9/1974 | Kelley et al. | 43/56 |
| 4,771,564 | 9/1988 | Whitley | 43/4 |
| 4,882,872 | 11/1989 | Todd | 206/315.11 |
| 4,958,730 | 9/1990 | Bunten | 206/315.11 |
| 5,097,616 | 3/1992 | Johnston, Jr. | 43/4 |

*Primary Examiner*—Richard K. Seidel
*Assistant Examiner*—Chuck Y. Mah
*Attorney, Agent, or Firm*—Leon Gilden

[57] ABSTRACT

A liquid fish attracting substance is arranged for application to artificial or cut bait. Fish attractant of a plurality of categories is arranged for selective application to fish bait and onto an individual's fingers to minimize contamination of the scented bait utilized in a fishing scenario. The arrangement includes a plurality of drawer members slidably mounted within a container to permit application of one or a plurality of fish scents to various categories of bait.

5 Claims, 2 Drawing Sheets

FISH BAIT SCENTING ARRANGEMENT

BACKGROUND OF THE INVENTION

1. Field of the Invention

The field of invention relates to fishing scenting structure, and more particularly pertains to a new and improved fish bait scenting arrangement wherein the same is arranged for the application of scent onto live or artificial bait.

2. Description of the Prior Art

Various categories of fish bait are utilized to attract fish. Such arrangements are set forth and exemplified in U.S. Pat. No. 4,776,858 to Mayer. U.S. Pat. Nos. 4,710,385; 4,764,383; and 4,962,609 set forth further examples of arrangements to provide for attracting fish through a scented bait arrangement.

As such, it may be appreciated that there continues to be a need for a new and improved fish bait scenting arrangement as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing bait scent organizations now present in the prior art, the present invention provides a fish bait scenting arrangement wherein the same is arranged to apply a predetermined scent onto fish bait. As such, the general purpose of the present invention, which will be described subsequently in greater detail, is to provide a new and improved fish bait scenting arrangement which has all the advantages of the prior art fish bait scents and none of the disadvantages.

To attain this, the present invention provides a liquid fish attracting substance arranged for application to artificial or cut bait. Fish attractant of a plurality of categories is arranged for selective application to fish bait and onto an individual's fingers to minimize contamination of the scented bait utilized in a fishing scenario. The arrangement includes a plurality of drawer members slidably mounted within a container to permit application of one or a plurality of fish scents to various categories of bait.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fish bait scenting arrangement which has all the advantages of the prior art fish bait scent organizations and none of the disadvantages.

It is another object of the present invention to provide a new and improved fish bait scenting arrangement which may be easily and efficiently manufactured and marketed.

It is a further object of the present invention to provide a new and improved fish bait scenting arrangement which is of a durable and reliable construction.

An even further object of the present invention is to provide a new and improved fish bait scenting arrangement which is susceptible of a low cost of manufacture with regard to both materials and labor, and which accordingly is then susceptible of low prices of sale to the consuming public, thereby making such fish bait scenting arrangements economically available to the buying public.

Still yet another object of the present invention is to provide a new and improved fish bait scenting arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
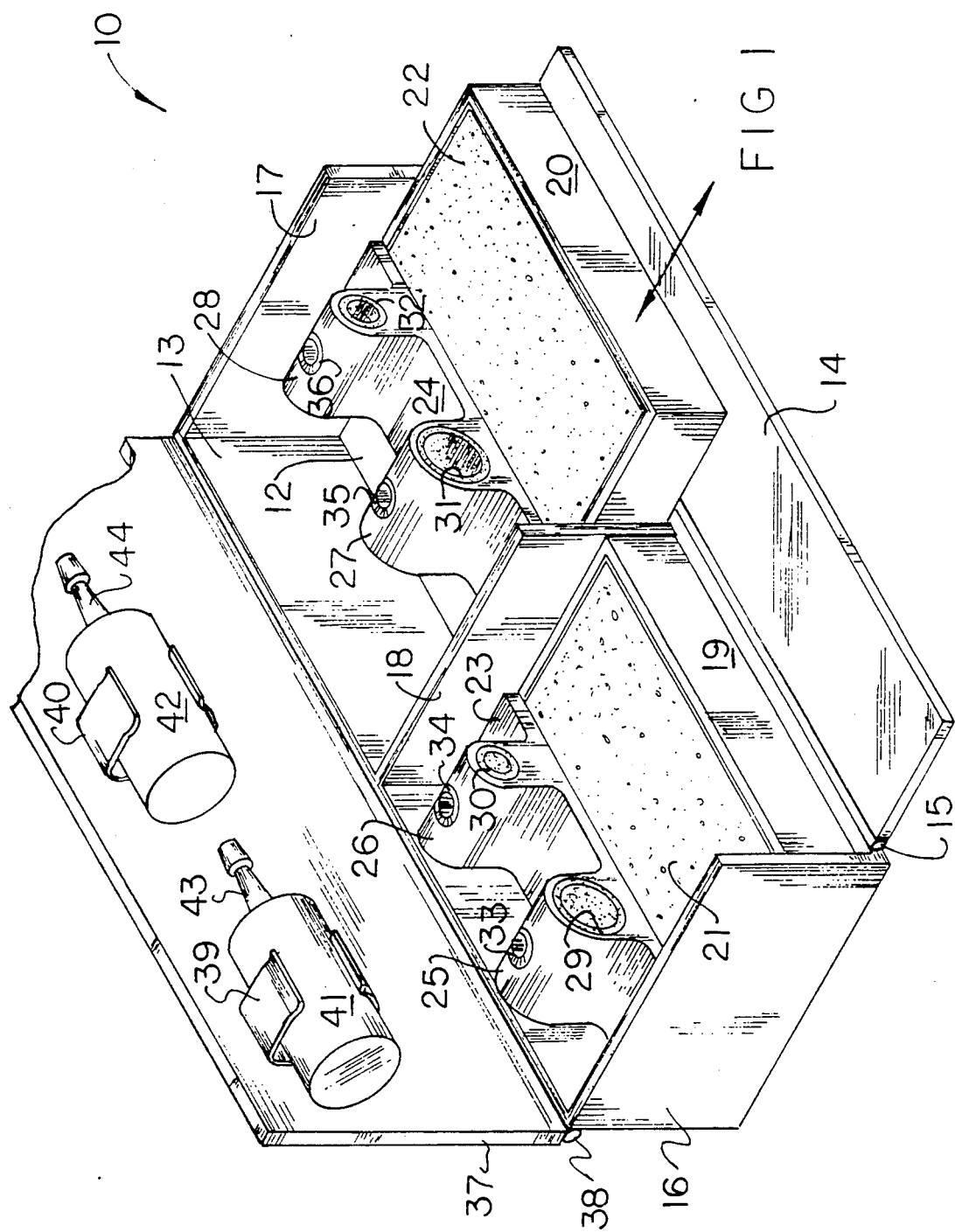
FIG. 1 is an isometric illustration of the apparatus of the invention arranged for application of fish scent onto bait.
Figure 2:
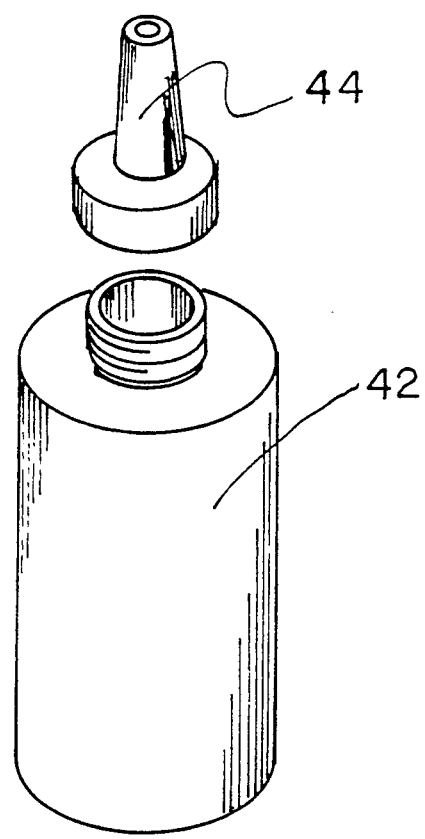
FIG. 2 is an isometric illustration of one of a plurality of reservoir containers utilized by the invention.
Figure 3:
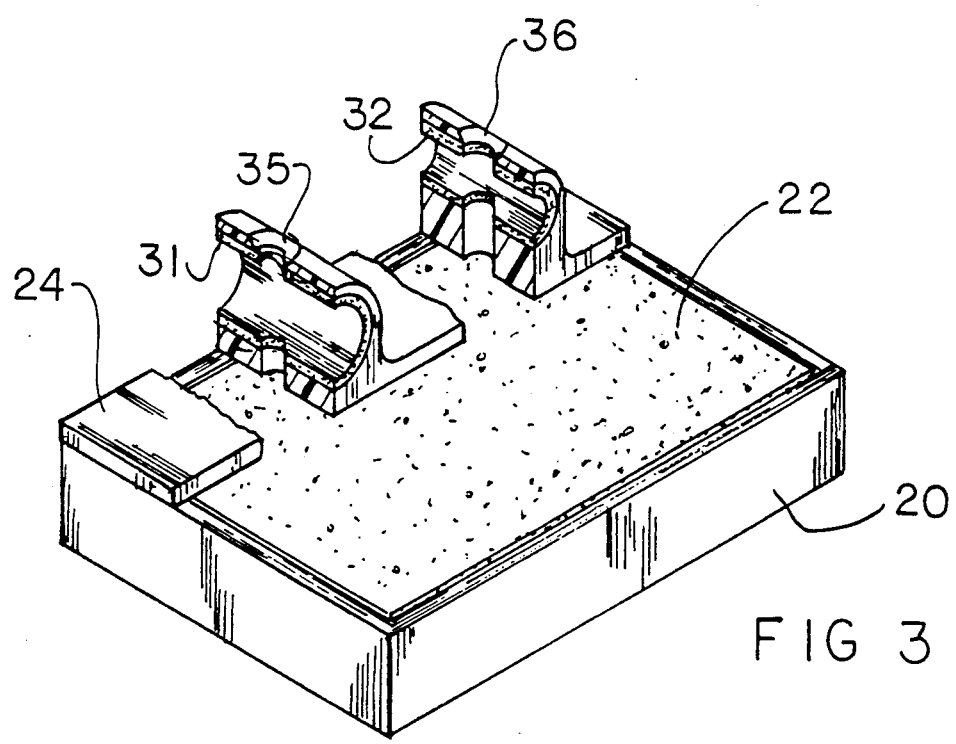
FIG. 3 is an enlarged isometric illustration, partially in section, of the application drawer utilized by the container structure as illustrated in FIG. 1.

With reference now to the drawings, and in particular to FIGS. 1 to 3 thereof, a new and improved fish bait scenting arrangement embodying the principles and concepts of the present invention and generally designated by the reference numeral 10 will be described.

More specifically, the fish bait scenting arrangement of the instant invention includes the application of various fluid scents onto fish bait, in a manner as set forth in U.S. Pat. No. 4,776,858 to apply various bait coloration to fishing bait, and U.S. Pat. No. 4,710,385 to attract a composition for luring fish when used as a hand soap to remove human scent, both patents of which are incorporated herein by reference.

The application of scent to fishing bait is of a type utilized in the prior art, wherein live or artificial bait may be utilized, wherein scent is made from typical household cooking items such as vegetable oil blended with garlic salt, red food coloring to attract various trout and striped bass. Vegetable oil blended with onion and salt, and food coloring such as blue food coloring for identification, may be utilized to attract striped bass. A combination of vegetable oil, garlic salt, food coloring, and various vegetable oils in margarine form may be utilized to attract larger cat fish and striped bass as examples.

The apparatus of the invention 10 includes a container having a container floor 12, a container rear wall 13 fixedly mounted in an orthogonal relationship relative to the container floor 12, with the container front wall 14 hingedly mounted to the container floor about a front wall hinge 15. A first end wall 16 is spaced from and parallel a second end wall 17 at opposed ends of the floor 12, with a divider wall 18 positioned medially between the first and second end walls in a parallel relationship. The divider wall 18 is arranged to mount respective first and second slide drawers 19 and 20 onto the floor 12 between the respective first and second end walls 16 and 17 and the compartments formed therebetween. The first and second slide drawers 19 and 20, as illustrated in FIG. 1, include drawer cavities having respective first and second sponge applicators 21 and 22 positioned coextensively within the drawer cavities. First and second applicator support plates 23 and 24 are fixedly mounted in respective first and second drawers rearwardly of a front wall of each drawer to expose respective first and second sponge applicator members 21 and 22. The first support plate includes a first support plate first cylindrical sleeve and a first support plate second cylindrical sleeve arranged in a parallel relationship relative to one another having respective first and second sponge tubes 29 and 30 mounted therewithin, wherein the first and second sponge tubes 29 and 30 are of respective first and second diameters with the second diameter less than the first diameter. A similar structure is mounted to the second support plate, wherein the second support plate includes second support plate first and second cylindrical sleeves 27 and 28 having respective third and fourth sponge tubes 31 and 32 of respective first and second diameters. The first and third sponge tubes of the first diameter are arranged to receive an individual's fingers therewithin to mask and assist in removal of various human scent prior to application of the scent to bait. Bait such as worms, either artificial or cut, are directed through the respective second and fourth sponge tubes 30 and 32. Fluid scent is directed onto the sponge tubes through respective first, second, third, and fourth access bores 33, 34, 35, and 36 respectively in fluid communication with the respective first, second, third, and fourth sponge tubes 29, 30, 31, and 32. The container lid 37 of the container includes a first and second U-shaped spring clip 39 and 40 to removably mount respective first and second fluid dispenser containers 41 and 42 that have respective first and second container nozzle members 43 and 44 positioned therefrom as the nozzle members 43 and 44 are arranged for complementary reception within the respective access bores 33-36. In this manner, the plurality of fish scent and dye coloration fluids may be mounted within the respective first and second containers for application in combination together or individually into the respective sponge tubes 29-32. The first and second sponge applicator members 21 and 22 are arranged for accommodating the fluids from the containers 41 and 42 for application to an individual's hand to insure that human scent is not available to contaminate the scent applied to bait directed through the sponge tubes 29-32.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fish bait scenting arrangement, comprising,
   a container, the container having a floor, a rear wall fixedly mounted to the floor, and a front wall, the front wall including a front wall hinge hingedly mounting the front wall to the floor coextensively to the floor,
   and
   a first end wall spaced from and parallel a second end wall at opposed distal ends of the floor, and a divider wall medially and parallel of the first end wall and second end wall fixedly mounted to the floor,
   and
   a first slide drawer mounted between the first end wall and the divider wall, and a second slide drawer mounted slidably between the divider wall and the second end wall,
   and
   a container lid, the container lid including a container hinge hingedly mounting the container lid to the container rear wall,
   and
   the first slide drawer including a first sponge applicator mounted within the first slide drawer, and the second slide drawer including a second sponge applicator mounted within the second slide drawer, wherein the first sponge applicator and the second sponge applicator are arranged for receiving fluid attractant, and the container lid includes a first U-shaped spring clip and a second U-shaped spring clip, and a first fluid dispenser container mounted within the first U-shaped spring clip, and a second fluid dispenser container mounted within the second U-shaped spring clip, wherein the first fluid dispenser container and the second fluid dispenser container are movably mounted relative to the respective first U-shaped spring clip and the second U-shaped spring clip, wherein the first fluid dispenser container is arranged for housing a first fluid fish attractant and the second fluid dispenser container is arranged for containing a second fluid fish attractant.

2. An arrangement as set forth in claim 1 wherein the first slide drawer includes a first support plate mounted thereon, and the second slide drawer includes a second support plate mounted thereon, the first slide drawer includes a first slide drawer front wall, the second slide drawer includes a second slide drawer front wall, the first support plate mounted on the first slide drawer rearwardly of the first slide drawer front wall, the second support plate mounted on the second slide drawer rearwardly of the second slide drawer front wall, the first support plate includes a first cylindrical sleeve and a second cylindrical sleeve fixedly thereon, wherein the first cylindrical sleeve and second cylindrical sleeve are of a respective first diameter and a second diameter, wherein the first diameter is greater than the second diameter, and the first sleeve is arranged parallel to the second sleeve, the second support plate includes a second support plate first cylindrical sleeve and a second support plate second cylindrical sleeve, the second support plate first cylindrical sleeve is of the first diameter and the second support plate second cylindrical sleeve is of the second diameter, and the first support plate first cylindrical sleeve and the second support plate second cylindrical sleeve are in a parallel relationship fixedly mounted on the second support plate.

3. An arrangement as set forth in claim 2 wherein the first support plate first cylindrical sleeve includes a first sponge tube mounted coextensively therewithin, the first support plate second cylindrical sleeve includes a second sponge tube mounted coextensively therewithin, the second support plate first cylindrical sleeve includes a third sponge tube mounted coextensively therewithin, and the second support plate second cylindrical sleeve includes a fourth sponge tube mounted coextensively therewithin, and the first support plate first cylindrical sleeve includes a first access bore directed through the first support plate first cylindrical sleeve in fluid communication with the first sponge tube, the first support plate second cylindrical sleeve includes a second access bore in fluid communication with the first support plate second cylindrical sleeve, the second support plate first cylindrical sleeve includes a third access bore in fluid communication with the third sponge tube, and the second support plate second cylindrical sleeve includes a fourth access bore in fluid communication with the fourth sponge tube.

4. An arrangement as set forth in claim 3 wherein the first dispenser container includes a first container nozzle, the second fluid dispenser container includes a second container nozzle, and each container nozzle is arranged for reception within one of said first, second, third, and fourth access bores.

5. An arrangement as set forth in claim 4 wherein the first slide drawer is slidably mounted on the container floor, and the second slide drawer is slidably mounted on the container floor.

* * * * *